(12) United States Patent
Nokleby et al.

(10) Patent No.: US 11,697,558 B2
(45) Date of Patent: Jul. 11, 2023

(54) AUTOMATED DETECTION OF CARTON DAMAGE

(71) Applicant: Target Brands, Inc., Minneapolis, MN (US)

(72) Inventors: Matthew Nokleby, Minneapolis, MN (US); Deepti Pachauri, Minneapolis, MN (US); Kenneth Zins, St. Paul, MN (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 17/104,856

(22) Filed: Nov. 25, 2020

(65) Prior Publication Data

US 2022/0162012 A1 May 26, 2022

(51) Int. Cl.
*B65G 43/08* (2006.01)
*G06T 7/00* (2017.01)

(52) U.S. Cl.
CPC ............ *B65G 43/08* (2013.01); *G06T 7/0002* (2013.01); *B65G 2203/0208* (2013.01); *B65G 2203/041* (2013.01); *G06T 2207/20081* (2013.01); *G06T 2207/20084* (2013.01)

(58) Field of Classification Search
CPC ............ B65G 43/08; B65G 2203/0208; B65G 2203/041; G06T 7/0002; G06T 7/2207; G06T 7/20081; G06T 2207/20084
USPC .......................................................... 198/444
See application file for complete search history.

(56) References Cited

U.S. PATENT DOCUMENTS

| | | | |
|---|---|---|---|
| 7,640,169 B2 | 12/2009 | Horton | |
| 8,688,598 B1 | 4/2014 | Shakes et al. | |
| 10,134,004 B1 | 11/2018 | Liberato, Jr. et al. | |
| 10,796,423 B2* | 10/2020 | Goja | G06Q 10/06395 |
| 2016/0154939 A1 | 6/2016 | Grabiner et al. | |
| 2019/0102874 A1* | 4/2019 | Goja | G06T 7/74 |

(Continued)

FOREIGN PATENT DOCUMENTS

DE 102016220723 A1 4/2018
JP 2019527865 A 10/2019

OTHER PUBLICATIONS

Sun, W., Method For Identifying Express Parcel Breakage Based on Internet of Things, Involves Calculating Damaged Picture to Obtain Damage Degree, Where Damage Degree Exceeds Preset Threshold Value Comprising Pre-warning Prompt, 2021, China, CN 113673542 A (Year: 2021).*

(Continued)

*Primary Examiner* — Gene O Crawford
*Assistant Examiner* — Lester Rushin, III
(74) *Attorney, Agent, or Firm* — Merchant & Gould P.C.

(57) ABSTRACT

Methods and systems for automated detection of carton damage are disclosed. One method includes capturing one or more images of a carton via a camera system at a routing location within a warehouse of a retail supply chain, and applying a machine learning model to determine a likelihood of damage of the carton. The method can include, based on the likelihood of damage being above a particular threshold, identifying the carton as damaged. A carton assessment record can be stored in a carton damage tracking database, including the one or more images of the carton alongside the likelihood of damage and the routing location.

21 Claims, 12 Drawing Sheets

(56) References Cited

U.S. PATENT DOCUMENTS

2021/0019871 A1* 1/2021 Goja .................. G06N 5/022
2021/0224736 A1* 7/2021 Abrahamson ...... G06Q 10/0833

OTHER PUBLICATIONS

Noceti et al., A multi-camera system for damage and tampering detection in a postal security framework (Research—Open Access), EUROSIP Journal on Image and Video Processing (https://doi.org/10.1186/s13640-017-0242-x; Dated: Nov. 2018; 13 Pages.
Consulting & Technology—AI-Based Identification Solutions in Logistics—Scanner free logistics based on Artificial Intelligence save significant work effort and add intrinsic stability to the processes; Dated 2020; 8 Pages.

* cited by examiner

Track Carton by Barcode

| Time Period | DC Number | Enter Barcode | |
|---|---|---|---|
| Last 4 Hours | T0555 | XXXXX | Submit |

CARTON DETAIL

| Timestamp | ART Line | Barcode | Result | Status | Exit Path | Image |
|---|---|---|---|---|---|---|
| 2020-10-26 06:26:00 | T0555ACM0007 | XXXX | Valid | Success | Pick | Link |
| 2020-10-26 06:26:01 | T0555ACM0006 | XXXY | Valid | Success | Shipping | Link |
| 2020-10-26 06:26:03 | T0555ACM0005 | XXXZ | Valid | Success | Shipping | Link |
| ... | | | | | | |

CONVEYOR/SORTER DETAIL

| Timestamp | CODE1-BARCODE | CODE2-BARCODE | CODE1-SCANNER | CODE2-SCANNER |
|---|---|---|---|---|
| 2020-10-26 06:26:00 | XXXX | | 01 | |
| 2020-10-26 06:26:01 | XXXZ | XXXY | 01 | 02 |
| 2020-10-26 06:26:03 | | XXXX | | 01 |
| 2020-10-26 06:52:00 | | | | |
| ... | | | | |

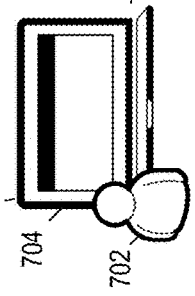

FIG. 10

AUTOMATED DETECTION OF CARTON DAMAGE

BACKGROUND

In existing supply chain infrastructures implemented by a retailer, it is common to experience damage to inventory due to handling by vendors, as well as within that retailer supply chain itself. For example, damage may occur to cartons containing inventories as those cartons are unloaded from trucks arriving from vendor locations, or has those cartons are routed through a warehouse to a final destination (e.g., storage within the warehouse or to an end retail location). It can be difficult to determine where in a supply chain those damages occur, as well as whether damage occurrences are due to a common root cause (e.g., a particular mishandling step or particular equipment within a warehouse or used by a vendor). Accordingly, it may be difficult, if not impossible, to attribute carton damage to a particular location within a warehouse (e.g., a particular handling step) or even to a vendor prior to receipt of the carton.

In the existing systems, damage observed by a human being may be recorded in a warehouse management system, with significant analysis required to determine root causes of such damage. However, it is often the case that users who are forced to record the root cause of damage will select, in a software tracking tool, an inappropriate or inaccurate option. For example, users may opt to not record defects, or may record incomplete information if manual entry of defect information is cumbersome. Still further, different users at different locations within a supply chain may assess damage differently. As such, there is no reliable way to accurately root cause damage to inventory.

SUMMARY

In general, the present disclosure relates to automatic detection of damage to cartons, such as boxes, at one or more locations within a warehouse in a supply chain of a retailer. Carton damage detection is performed so that cartons, which pass through the warehouse at high volume, may be automatically rejected or removed from use.

In a first aspect, a method includes capturing one or more images of a carton via a camera system at a routing location within a warehouse of a retail supply chain, and applying a machine learning model to determine a likelihood of damage of the carton. The method can include, based on the likelihood of damage being above a particular threshold, identifying the carton as damaged. A carton assessment record can be stored in a carton damage tracking database, including the one or more images of the carton alongside the likelihood of damage and the routing location.

In a second aspect, a carton damage detection system includes an image capture system located at a routing location within a warehouse of a retail supply chain. The carton damage detection system further includes an image analysis server local to the image capture system, the image analysis server communicatively connected to the image capture system and configured to host a carton damage tracking database. The image analysis server is configured to: receive at least one image of a carton from the image capture system; apply a machine learning model to the at least one image to determine a likelihood that the carton is damaged; and store a carton assessment record in the carton damage tracking database, the carton assessment record including the at least one image of the carton alongside the likelihood that the carton is damaged and the routing location.

In a third aspect, a method includes automatically capturing one or more images of cartons via camera systems positioned at each of a plurality of routing locations within a warehouse of a retail supply chain, and applying a machine learning model to determine a likelihood of damage to each of the cartons, the machine learning model being a convolutional neural network trained using sample images of damaged cartons and undamaged cartons. The method further includes, based on the likelihood of damage to a carton from among the imaged cartons being above a particular threshold, identifying the carton as damaged. The method includes storing a carton assessment record in a carton damage tracking database for each of the cartons, the carton assessment record including the one or more images alongside the likelihood of damage and the routing location at which the images are captured, and identifying a location within the warehouse as a root cause of damage to cartons based on damage being detected via the camera systems of the plurality of routing locations.

BRIEF DESCRIPTION OF THE DRAWINGS

The same number represents the same element or same type of element in all drawings.

FIG. 10 is an example user interface illustrating a logging of carton damage assessments at various locations within a warehouse environment, showing movement of a particular carton through a warehouse in an example embodiment.

DETAILED DESCRIPTION

As briefly described above, embodiments of the present invention are directed to automated detection of carton damage in a supply chain environment, such as at a warehouse within a retail supply chain. Carton damage detection is performed so that cartons, which pass through the warehouse at high volume, may be automatically rejected or removed from use. Additionally, by placing carton imaging systems at various locations within a product flow through a warehouse, or a set of warehouses, a particular location at which damage to cartons occurs may be detected, or a particular cause of damage common across warehouses may be determined.

In example implementations, the present invention is performed using local computing systems supplied with a machine learning model that can be used to detect carton damage. The local machine learning model may be selected so as to be "lightweight" and computationally inexpensive. This allows a high volume of carton assessments to be performed at a computing system at a warehouse, which may not have robust communication access to a remote server for computationally intensive operations.

In general due to the methods and systems described herein, a variety of defect detection analyses may be performed rapidly and reliably, rather than relying on accurate user entry of detected defects. Additionally, detected defects may be automatically associated with a particular carton and/or location within a warehouse environment, thereby allowing damage to be root-caused to a particular location or entity, and proof made available of such damage with little or no additional user effort required.

Figure 1:
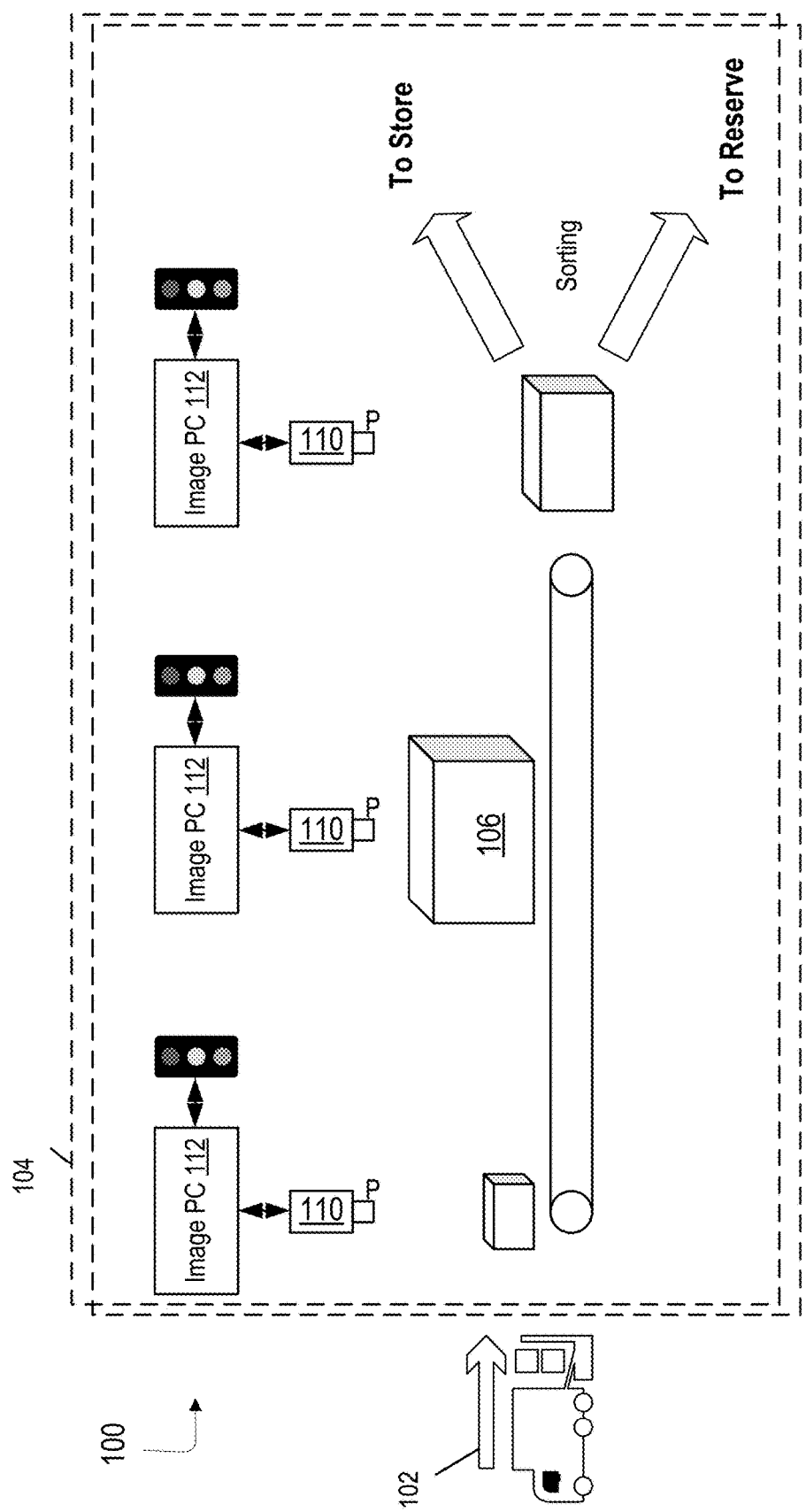
FIG. 1 is a schematic illustration of image capture of a carton at various routing locations within a warehouse environment.

Referring first to FIG. 1, a schematic illustration of carton travel through one or more warehouse locations of a retail supply chain 100 is shown. In the example as illustrated, a vendor supply 102 may arrive at a particular warehouse 104 of a plurality of different warehouses.

At the warehouse 104, there may be a general routing path for cartons received, such that each carton may be appropriately routed to its destination (e.g., A retail location or a reserve storage location within a warehouse itself). To ensure that cartons are routed appropriately, in some instances overhead cameras, shown as cameras 110, may be used to capture images of such cartons 106.

While in some embodiments a single overhead camera may be used, in other instances or locations within a warehouse, more than one camera may exist (e.g., a multi-sided camera tunnel may be implemented, using 3-6 cameras to capture a plurality of sides of a carton). In such instances, the system described herein may utilize a plurality of images of each carton from a plurality of different perspectives (e.g., top, front, rear, left/right, or angles thereof) to detect damage in an analogous manner to that described herein. Additionally, while described in the context of image capture, it is recognized that each camera may be used to capture video content, such that one or more frames of the video content may be used for image analysis associated with a detected carton.

In some instances, a computing system, shown as image PC 112, may be associated with each camera 110 (or a plurality of cameras if multiple cameras are positioned at each location). Each image PC 112 may receive images captured by the camera 110, for example to ensure that cartons are routed appropriately. For example, each carton 106 may have a label positioned on a surface visible to the camera 110, such that movement of the carton 106 may be tracked as that carton 106 traverses a particular route through the warehouse. Details regarding example carton travel within a warehouse, and associated image capture for that carton, are provided below in conjunction with FIGS. 3A-3C.

In the example shown each image PC 112 may be associated with a display, such as a display indicator showing whether damage to a particular carton 106 has been detected. Additionally, as noted below, a record of carton inspection, including records of any damage detected, may be aggregated at a computing system to local to the warehouse 104. As discussed further below, such records may be used to determine a root cause for carton damage, for example by detecting a location or handling step at which carton damage regularly occurs, a time of day at which carton damage regularly occurs, a vendor from which damaged cartons are regularly received, etc.

In some embodiments, the image PC 112 may forward captured images to a computing system local to the warehouse 104. Such a computing system may have stored thereon a machine learning model trained using images of damaged and undamaged cartons, and may be able to return a likelihood of damage when provided an image of a carton. Based on the likelihood of damage, a message may be returned to the image PC 112, said that a display indicating possible damage to the carton and may be presented to a user in proximity to the carton. Accordingly, that user may be able to individually inspect such a carton, remove, replace, or repair the carton that exhibits signs of damage.

Accordingly, through use of distributed cameras or other imaging systems within a warehouse, it is possible to automate detection of potential damage to cartons, and to both alert users as to such damage and aggregate damage records to root cause the source of the damage. This is particularly advantageous in such a warehouse environment, because of the high volume of cartons passing through such an environment on an hourly/daily basis, which makes manual inspection difficult, and root cause of damage by assessing damage records across the warehouse nearly impossible.

Figure 2:
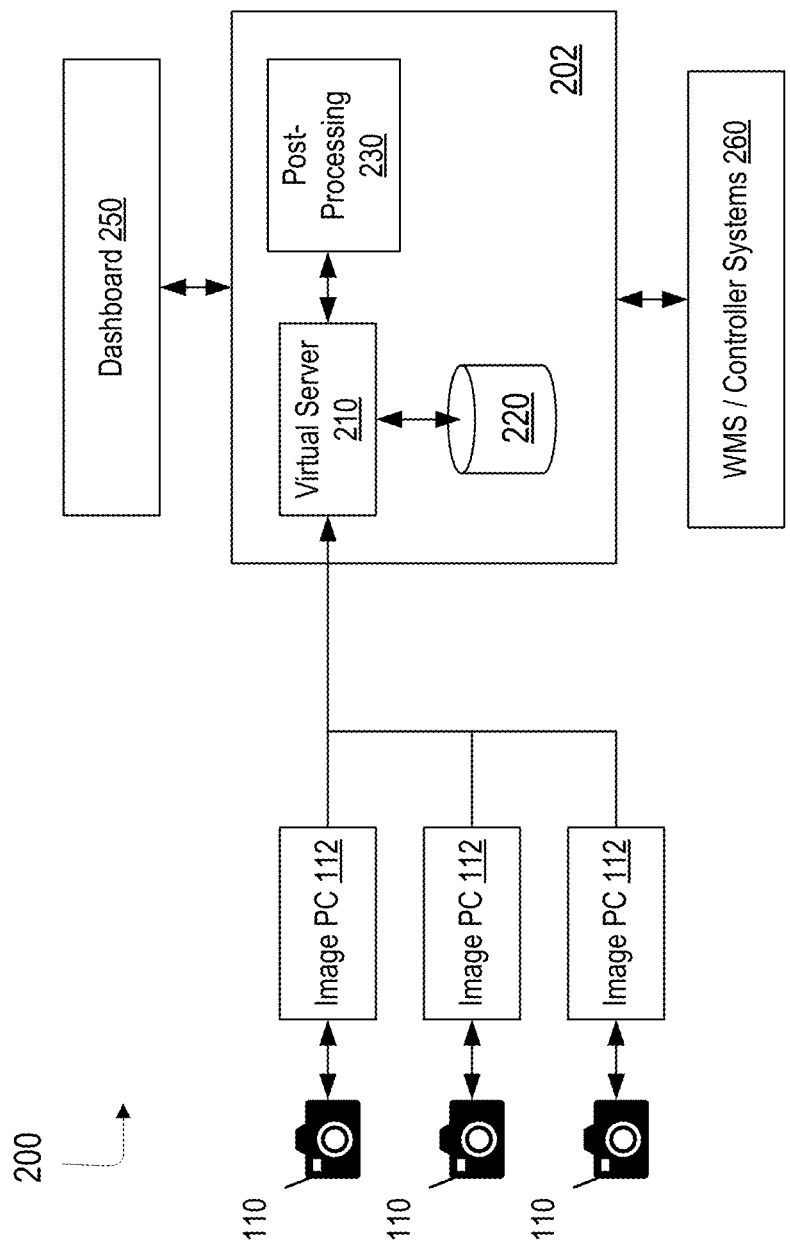
FIG. 2 is a schematic illustration of an automated carton damage detection system, according to an example embodiment.

FIG. 2 illustrates an automated carton damage detection system 200, according to example embodiments. In the example shown the system 200 includes a plurality of imaging systems, shown as cameras 110, communicatively connected to computing systems, shown as image PCs 112. Each of the cameras 110 may be positioned at different locations within a warehouse of a retail supply chain.

Each of the image PCs 112 may be communicatively connected to a local server system in 202. The local server system 202 may include a virtual server 210 which is communicatively connected to a database 220. In general, the local server system 202 will receive images captured by the cameras 110 and forwarded by the image PCs 112, and will perform analysis on those images to determine a likelihood of damage to cartons captured in the images. For example, the virtual server 210 may receive images and storage those images in the database 220. The virtual server 210 may also access a machine learning model in image post-processing module 230, which can output a likelihood of damage assessment based on the image. For example, the image post-processing module 230 may return a score to the virtual server 210 for storage alongside the received images in the database 220. The score may represent, for example, a likelihood of damage, where particular score thresholds define whether or not a carton is considered to be damaged. Additionally, the image post-processing module 230 may generate one or more recommended actions to be taken based on the score results. Actions to be taken may include, for example, replacement of the cart and, change to handling processes within a warehouse, apportionment of responsibility for damage to the carton to a warehouse handler and/or vendor, or other options.

Additionally, the image post-processing module 230 may forward the score to a metrics dashboard 250. The metrics dashboard may aggregate and present damage determinations captured from each of the cameras 110, and optionally recommend one or more actions to be taken based on to score results.

Furthermore, the local server system 202 may be in communication with one or more controllers and/or a warehouse management system, referred to collectively as WMS/Controller Systems 260, which may be used to control routing of cartons through the warehouse in response to determinations of whether particular cartons are deemed to be damaged. In particular, a warehouse management system may be used to store damage records associated with particular inventory and/or cartons, and controllers may be notified of carton damage to adjust automated routing of cartons through an automated warehouse supply chain.

As mentioned above, the local server system 202 may aggregate image information from various locations within a warehouse. However, due to the high volume of curtain images received and the limited available bandwidth typically present between a warehouse and enterprise cloud or other computing resources, in certain embodiments the local server system 202 will host the machine learning model that is used to assess carton damage. Accordingly, at each warehouse, a lightweight machine learning model may be deployed, such as a convolutional neural network. In particular example embodiments, a MobileNet V2 model is used. However, other models may be used as well that are able to execute within the limitations of the computing resources available at a warehouse.

In general, the model is trained, using training image data, to detect a variety of types of damage to cartons (typically cubic cartons). For example, a carton may have a tag (loose flap), a hole in a top or side, or are otherwise crushed/deformed to the extent that they are no longer square/rectangular. Other types of damage may also be detected based on the selected training data.

Figure 3A:
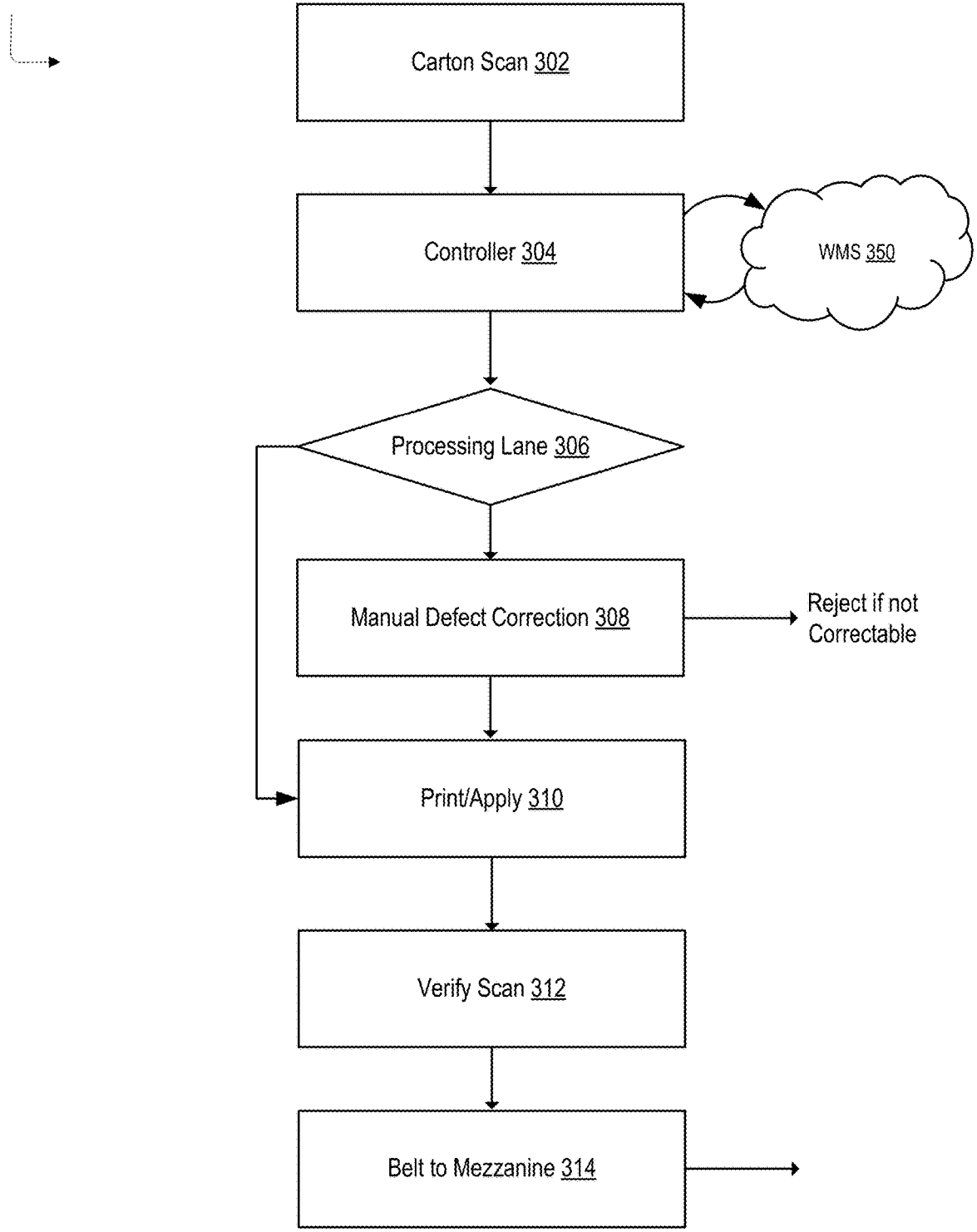
FIGS. 3A-3C illustrate example routing processes that may occur at routing locations within a warehouse of a retail supply chain.
Figure 3B:
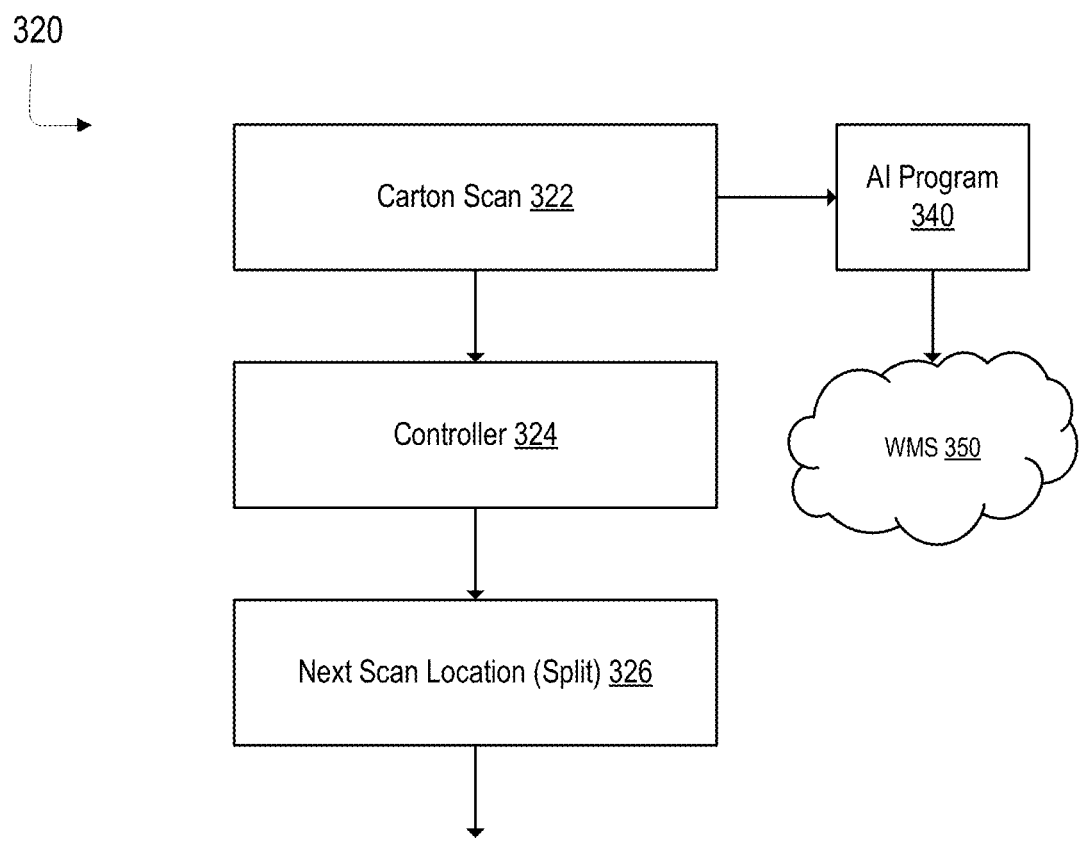
Figure 3C:
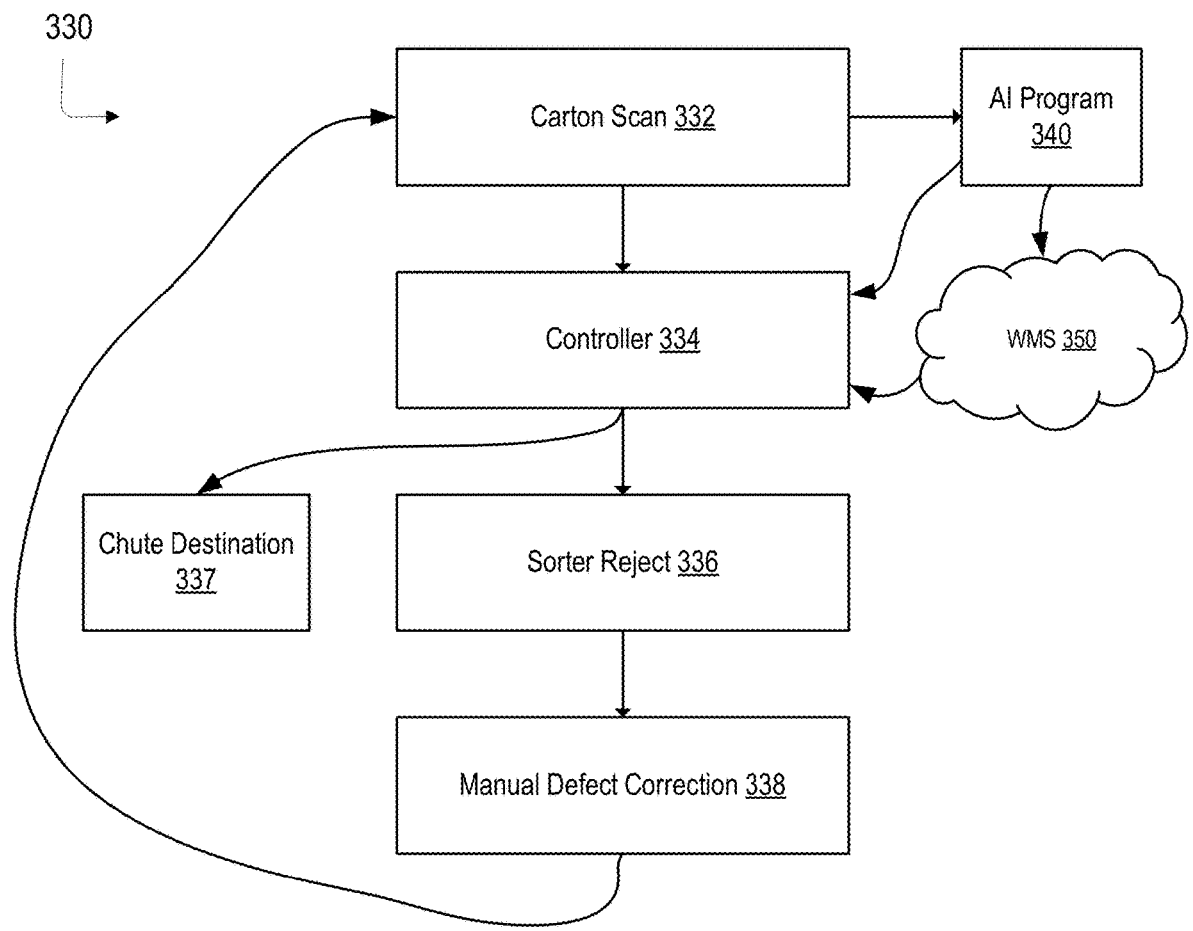

Referring now to FIGS. 3A-3C, an example schematic routing through a warehouse is depicted, in accordance with an embodiment of the present disclosure. In the example shown, each of FIGS. 3A-3C represents a scan location within a warehouse that reflects a particular stage in product handling. Referring first to FIG. 3A, an inbound scanning stage 300 is shown. The inbound scanning stage 300 may be performed, for example, upon receipt of a shipment from a vendor, e.g. via vendor supply 102 of FIG. 1.

As illustrated, upon receipt of goods from a vendor, a carton scan process 302 is performed. The carton scan process 302 may involve, for example, capturing an image of a carton as that carton is received from a vendor. Carton scan data, including bar code were other label information, as well as the image of the carton itself may be passed to a controller 304 (e.g., image PC 112) which may access a warehouse management system 350. The warehouse management system 350 can determine a type of label to print, as well as a destination of the carton (e.g., storage or a particular store/retail location). To the warehouse management system 350 may also determine whether to reject the item.

The carton is routed to a processing lane 306, which selectively either provides the carton to a manual defect correction stage 308 (e.g., if the carton is determined to be damaged) or to a print operation 310 if no damage is detected. If damage is detected, a manual defect correction process may be performed at the manual defect correction stage 308 in which a warehouse worker may retrieve and repackage goods within a carton and reintroduce that carton onto a conveyor, or may otherwise repair the packaging. If the package is not repairable/replaceable, or if the goods within the package are damaged, the package may be rejected entirely.

In the example shown, the print operation 310 may print and apply an appropriate label to the carton if no damage is detected. The label may identify, for example, a destination of the carton, and one or more handling rules. A scan verification operation 312 may then perform a scan of the applied label to determine that an appropriate label was applied to the correct carton. At this point, an appropriately labeled and scanned carton may be introduced onto a spiral belt 314 for transfer to a mezzanine for routing and further processing.

Notably, if the carton is routed to the manual defect correction stage 308, that carton may be manually corrected and re-introduced into the flow described above, e.g., to be labeled and scanned at operations 310, 312 before being transferred via the spiral belt 314 once corrected.

At this inbound scanning stage 300, the above-described carton damage detection may be performed at a time of initial carton scanning, for example to determine whether a carton received from a vendor is already damaged. Accordingly, such damaged cartons may be charged back to the vendor, e.g., such that the retailer need not take responsibility for the damaged item. In this way, early, rapid, and automated carton damage detection can provide significant efficiencies and cost savings for a retailer.

Referring to FIG. 3A generally, it is noted that although a particular sequence of steps is depicted, other sequences of steps or operations may be used as well. For example, rerouting of a carton to perform manual defect correction may in some cases be performed after a label is applied and scan is verified, but before being routed to the spiral belt 314. Other orders beyond the one depicted are possible as well. Additionally, referring to FIG. 3A generally, if a defect is detected at this stage, the defective carton may be removed from the system before further problems are caused, such as damage to routing equipment, lost product, or sending damaged goods to a store and/or customer.

Referring to FIG. 3B, a mezzanine scanning stage 320 is depicted. The mezzanine scanning stage 320 may be located at a different location than the inbound scanning stage 300, for example at a location within the warehouse such as a routing mezzanine at which cartons are unpacked and repacked for routing to stores and/or storage. In the example shown, a further carton scan process 322 may be performed to determine progress of cartons through the warehouse. In the example shown, images of such cartons and may be passed to a program, such as a machine learning model (shown as artificial intelligence program 340), which can determine a likelihood of damage to the carton. The AI program 340 may be, for example, located at local server system 202, as discussed above.

If damage is detected by the AI program 340, a message may be transmitted to the warehouse management system 350 to reject the carton as a next opportunity (at a next reject location within the routing/sorting process). A controller 324 will determine an appropriate routing for the carton, and, assuming the carton is not damaged, will pass the carton through a next scan location routing process 326 to determine its outbound destination. Accordingly, the warehouse management system 350 may notify one or more appropriate downstream controllers that can manage carton routing within the warehouse, e.g., to separate the carton from a general warehouse flow before it is scanned at its next location/destination.

It is noted that in some instances, there may be more than one curtain scan process 322 occurring in parallel, for example using multiple camera tunnels at the mezzanine. In such instances, the AI program 340 may validate images captured from all such tunnels concurrently.

Referring to FIG. 3C, an outbound scanning stage 330 is shown. The outbound scanning stage 330 includes a carton scan process 332 which again scans the carton to determine appropriate routing by capturing an image of the top of the carton (and optionally one or more sides of the carton) thereby capturing a routing label used on the carton. A controller 334 determines appropriate routing for the carton based on the scanned label. However, as above, an AI program 340 may again analyze image data captured during the carton scan process 332 to determine a likelihood of carton damage. If damage is detected, a notification may again be passed to a warehouse management system software 350, which may instruct controller 334 to reject the carton.

From the controller 334, a carton may be routed either to a sorter reject landing location 336 or an appropriate chute destination 337. The sorter reject landing location 336 may receive cartons that are identified as damaged by the AI program 340, such that controller 334 routes such cartons out of typical routing channels. The sorter reject landing location 336 may receive packages that are, for example, not only damaged, but possibly misrouted, mislabeled, or otherwise detected as erroneous. A manual defect correction stage 338 may be used, and a user positioned along the supply chain may take one or more actions to rectify detected issues with such cartons, including in the case of damage, replacement of the carton itself, e.g., transferring goods from a damaged carton to a new carton for further routing/processing, or otherwise repairing the carton. The new/repaired carton can then be labeled and tracked, by being reintroduced at the carton scan process 332.

Referring to FIGS. 3A-3C overall, it is noted that additional or different stages may be included in a warehouse; however, in some examples, warehouses within a particular retail organization may be arranged similarly and may have similar package handling processes. Accordingly, detected errors at a particular stage may correlate to errors experienced at an equivalent stage at a different warehouse location. Additionally, in general due to placement of cameras at each sorting and routing stage within a warehouse, individual warehouses may be analyzed to determine a root cause or timing of damage to cartons, in addition to existing assessments regarding mis-routing, etc.

Still further, in instances where a carton image is captured (whether damaged or not), such images may be provided to the warehouse management system 350. Accordingly, images of a state of the carton throughout the warehouse may be collected for a variety of purposes. For example, gradual degradation may be detectable as the same carton is scanned at multiple locations within the warehouse, and a damaged carton image may be captured and associated with a bar code of the package as proof of damage, since carton scan processes 302, 322, 332 are each positioned to obtain images of carton identifiers alongside the detection of potential carton damage. It is noted that the scan of a bar code, in association with the image scan, may be performed at a per-box level, and can be performed at any port after de-palletization of cartons when received from a vendor/shipping entity.

Figure 4:
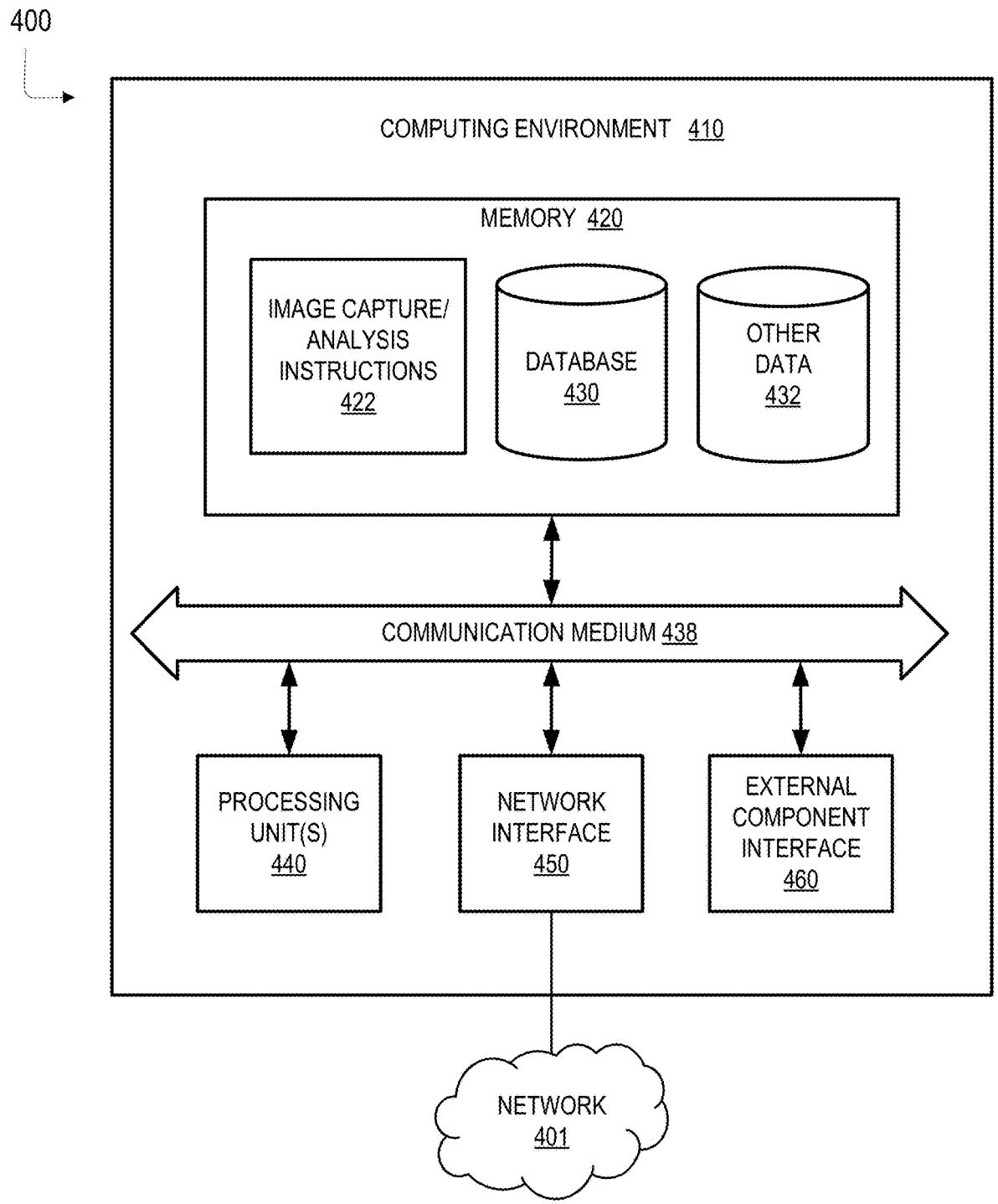
FIG. 4 is a schematic illustration of a computing device with which aspects of the present disclosure may be implemented.

Referring now to FIG. 4, a schematic illustration of a computing device 400 is provided, with which aspects of the present disclosure may be implemented. In an example, the image PC 112, the server system 202, the virtual server 210, post-processing system 230, dashboard 250, and/or optionally the warehouse management system 350 described above can be implemented as one or more systems 400 or one or more systems having one or more components of systems 400. In an example, the system 400 can include a computing environment 410. The computing environment 410 can be a physical computing environment, a virtualized computing environment, or a combination thereof. The computing environment 410 can include memory 420, a communication medium 438, one or more processing units 440, a network interface 450, and an external component interface 460.

The memory 420 can include a computer readable storage medium. The computer storage medium can be a device or article of manufacture that stores data and/or computer-executable instructions. The memory 420 can include volatile and nonvolatile, transitory and non-transitory, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data.

The memory 420 can store various types of data and software. For example, as illustrated, the memory 420 includes image capture and analysis instructions 422 for implementing one or more aspects of the carton image analyses described herein (e.g., as described in relation to FIGS. 1-3 and 5-9, below) in conjunction with automated carton damage detection, database 430 (e.g., as described in relation to databases 220 of FIG. 2), as well as other data 432. In some examples (e.g., where the computing environment 410 is a user device, for example useable to access data at the dashboard 250), the memory 420 can include instructions for obtaining content from a content provider and providing the content to a user.

The communication medium 438 can facilitate communication among the components of the computing environment 410. In an example, the communication medium 438 can facilitate communication among the memory 420, the one or more processing units 440, the network interface 450, and the external component interface 460. The communications medium 438 can be implemented in a variety of ways, including but not limited to a PCI bus, a PCI express bus accelerated graphics port (AGP) bus, a serial Advanced Technology Attachment (ATA) interconnect, a parallel ATA interconnect, a Fiber Channel interconnect, a USB bus, a Small Computing system interface (SCSI) interface, or another type of communications medium.

The one or more processing units 440 can include physical or virtual units that selectively execute software instructions. In an example, the one or more processing units 440 can be physical products comprising one or more integrated circuits. The one or more processing units 440 can be implemented as one or more processing cores. In another example, one or more processing units 440 are implemented as one or more separate microprocessors. In yet another example embodiment, the one or more processing units 440 can include an application-specific integrated circuit (ASIC) that provides specific functionality. In yet another example, the one or more processing units 440 provide specific functionality by using an ASIC and by executing computer-executable instructions.

The network interface 450 enables the computing environment 410 to send and receive data from a communication network (e.g., network 401). The network interface 450 can be implemented as an Ethernet interface, a token-ring network interface, a fiber optic network interface, a wireless network interface (e.g., WI-FI), or another type of network interface, and may be useable to connect to network 401, such as the internet.

The external component interface 460 enables the computing environment 410 to communicate with external devices. For example, the external component interface 460 can be a USB interface, Thunderbolt interface, a Lightning interface, a serial port interface, a parallel port interface, a PS/2 interface, and/or another type of interface that enables the computing environment 410 to communicate with external devices. In various embodiments, the external component interface 460 enables the computing environment 410 to communicate with various external components, such as external storage devices, input devices, speakers, modems, media player docks, other computing devices, scanners, digital cameras, and fingerprint readers.

Although illustrated as being components of a single computing environment 410, the components of the computing environment 410 can be spread across multiple computing environments 410. For example, one or more of instructions or data stored on the memory 420 may be stored partially or entirely in a separate computing environment 410 that is accessed over a network.

Figure 5:
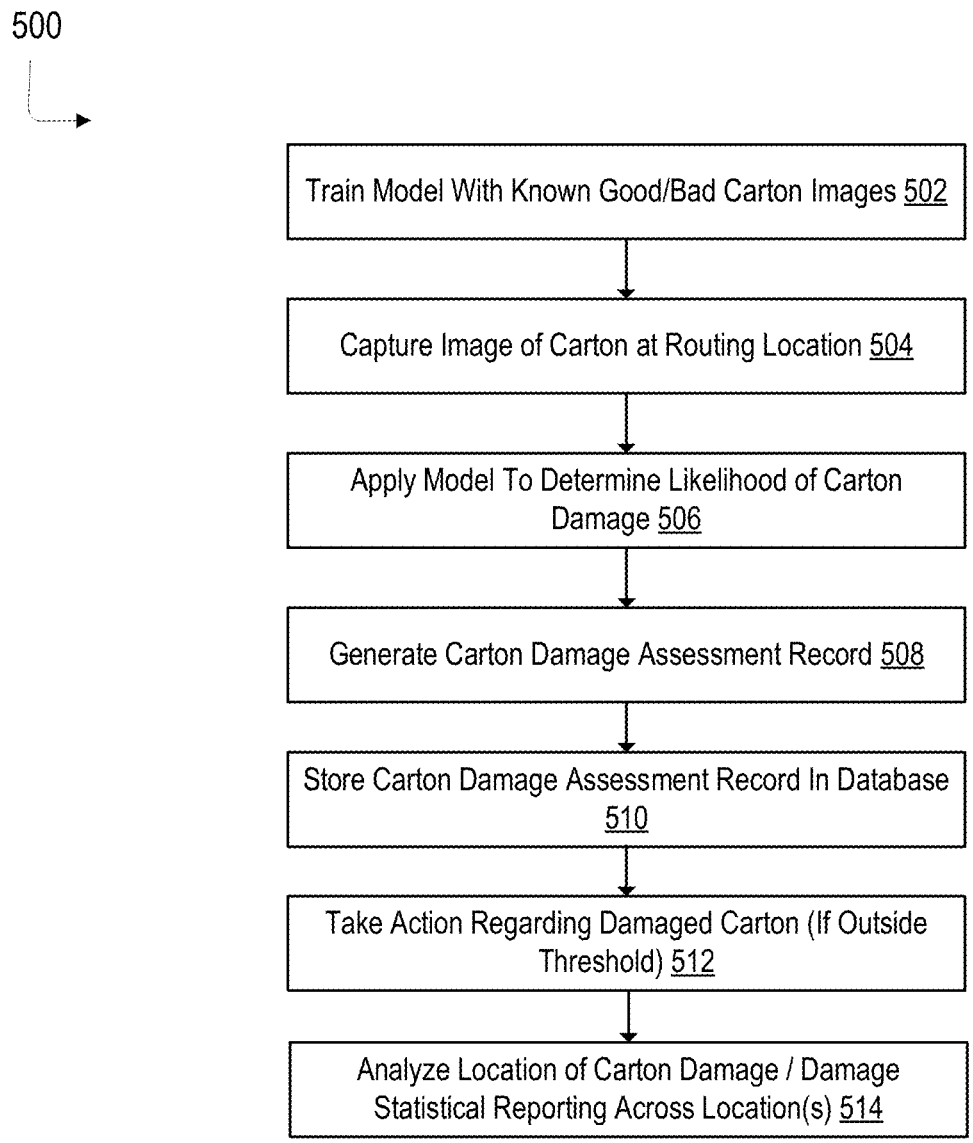
FIG. 5 is a flowchart of an example process for automated detection of carton damage within a retail supply chain, according to an example embodiment.

Referring now to FIGS. 5-9, a specific example of a method of automating detection of damaged cartons within a retail supply chain is provided, as well as example user interfaces and/or reporting that may be generated by the systems described herein for display at either an imaging PC 112 or via dashboard 250, described above. Referring first to FIG. 5, a flowchart of an example process 500 for automated detection of carton damage within a retail supply chain, according to an example embodiment. In the example shown, the method includes training a machine learning model using images of cartons known to be good and known to be damaged (step 502). This can include, for example, creating a machine learning model and deploying that model, once trained, to a warehouse computing system for use, e.g., at server system 202 of FIG. 2. In some embodiments, as described above, the machine learning model can be a convolutional neural network model, such as the MobileNet V2 model. However, other models may be used as well.

In the example shown, the method 500 further includes capturing an image of a carton at a routing location (step 504). As discussed above, this can include use of an overhead camera to capture an image of the carton, including an image of the label placed on top of the carton. Accordingly, concurrently with capturing routing information, and assessment of carton damage may be performed.

Once the images captured, the method 500 may include applying the model to determine a likelihood of carton damage (step 506). In some embodiments, this may include supplying the captured image to the machine learning model, and receiving a score from the machine learning model representing a likelihood of damage. This may also include, for example, comparing the received score to one or more thresholds representing user defined levels at which damage may be considered possible or may be considered unacceptably high. In one possible implementation reflected below and in conjunction with FIG. 6, a color coded scaled may be applied in accordance with those thresholds, using a green/yellow/red coding for undamaged, uncertain, and damaged cartons. A further category may be used for detecting an empty (e.g., unlabeled) carton reflected in a captured image.

Once a score is received and damage is determined, a carton damage assessment record may be generated (step 508) and stored in a database (step 510), such as database 220 of FIG. 2. The carton damage assessment record may include the image, as well as the score, optionally the rating of damage based on the threshold determination, and identification information of the carton and location at which the images captured. For example, a carton identifier, a warehouse identifier, a scan location identifier, a score, and a rating may be stored in conjunction with the image. This will allow the carton as damage assessment record to be used in a variety of ways.

For example, in the embodiment shown, one or more actions may be taken regarding a damaged carton (step 512). The one or more actions may include actuating a controller to route the carton to a carton reject lane automatically. Displaying to a user either via dashboard 250 or via an imaging PC 112, a user interface displaying the image and resulting analysis of damage to the carton. The user may then either confirm the damage assessment or override the damage assessment based on visual inspection of the carton.

In the example shown, the method 500 further includes analysis of a carton damage assessment record to provide statistical determinations regarding carton damage (step 514). This may occur, for example, based on collection of carton damage assessment records from a plurality of different cartons, at a plurality of different routing locations within a warehouse (e.g., at the different scanning operations described above in conjunction with FIGS. 3A-3C), and across a plurality of warehouses within a retail supply chain. Various comparisons may be performed and reports generated. For example, a report regarding damage assessment for a particular carton may be generated that shows the relative assessed damage score for that carton as the carton is routed through a warehouse. A further report may illustrate rates of damage that occur at a particular routing location within the warehouse, for example illustrating a propensity for a handling step occurring prior to receipt of the carton at the routing location as causing damage to the carton. Still further example reports may illustrate rates of scanning of cartons, including both good and damaged cartons. Additional reports may show compared if rates of damage determined at a plurality of locations within a single warehouse to determine the most likely areas of the warehouse causing carton damage, or to determine a likely cause of such damage. Still further reports may compare rates of damage between two (or more) similarly constructed warehouses, to determine discrepancies between handling of cartons at those respective warehouses. In this way, best practices for handling of curtains to minimize damage may be applied across warehouses within a retail supply chain. Other example reports are possible as well.

Figure 6:
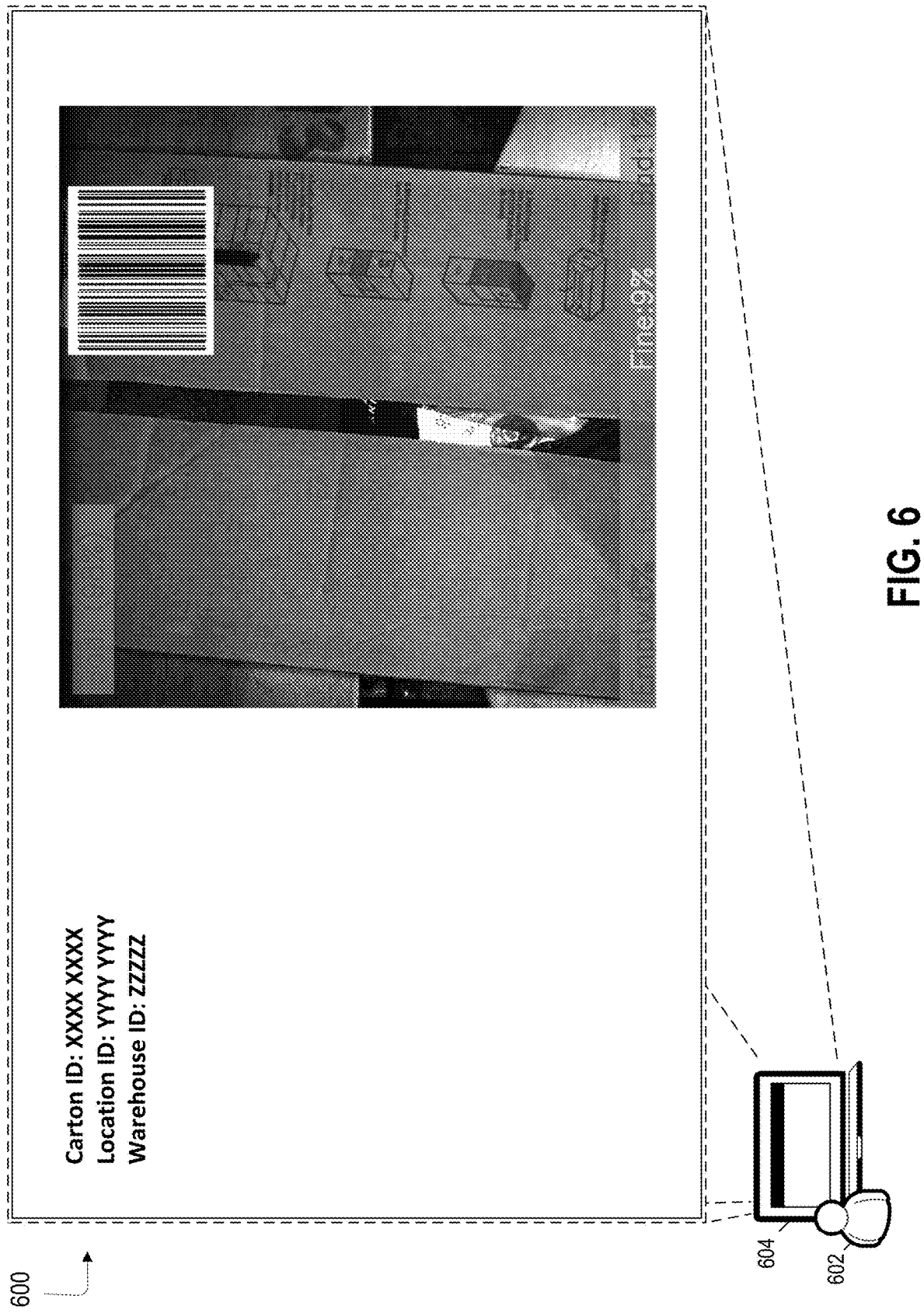
FIG. 6 is an example of a user interface displaying a carton damage assessment record, including stored image displayable at a routing location or via a dashboard, according to example aspects of the present disclosure.

FIG. 6 is an example of a user interface 600 including a stored image displayable at a routing location or via a dashboard, according to example aspects of the present disclosure. The user interface 600 may be presented to a user 602, such as a warehouse worker or analyst via a computer 604, which may either access a dashboard 250 or imaging PC 112 described above.

In the example embodiment shown, information regarding the carton damage assessment record is displayed, including a carton identifier, a location identifier (e.g., a location within the warehouse), and a warehouse identifier within the Retail Supply chain. Additionally, an image may be displayed that shows the captured image with an overlay of analysis determined automatically via the machine learning model. In the example shown, a curtain is identified as being damaged, with an overlay indicating a likelihood of damage ("Bad! (98%)"). Additionally, along a bottom of the image, a running percentage of damage assessments within a predetermined time window may be provided, such that the user may be able to quickly identify whether a damage-causing event is occurring (or has occurred) at the particular location within a warehouse.

In example alternative embodiments, other information may be superimposed on the image of the carton, either upon retrieval of the image from a warehouse management system or in realtime as image or video data is captured. For example, an overlay on video data may be presented via the imaging PC 112 and/or dashboard 250, displaying an augmented reality display overlaying annotations regarding the damage or regarding identifying information for the carton. Additionally, instructions for rectifying damage may be presented to a user who may be required to address the damage in a manual defect correction stage.

Figure 7:
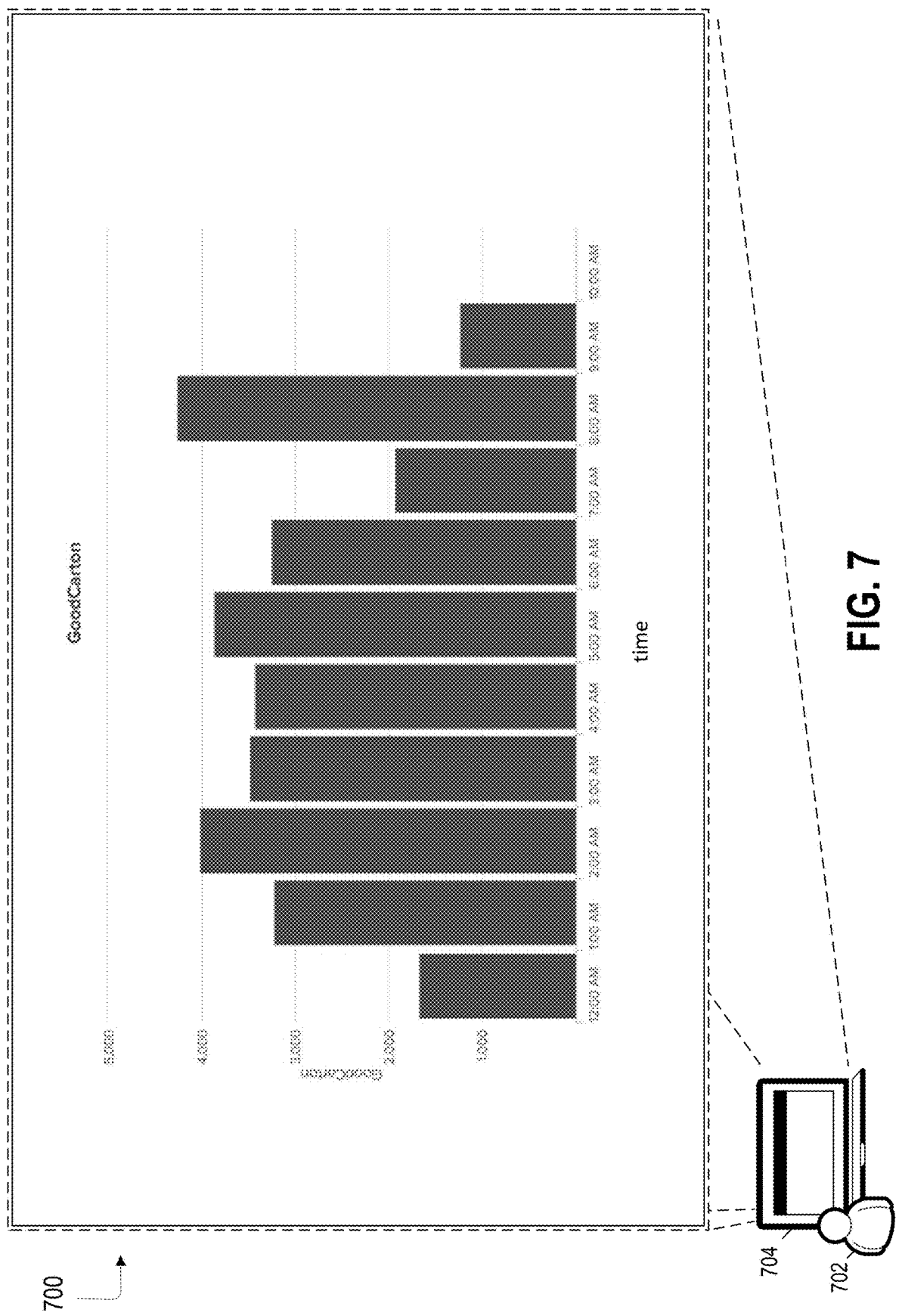
FIG. 7 is an example user interface depicting a chart illustrating automated carton damage assessments over time occurring within a warehouse environment.
Figure 8:
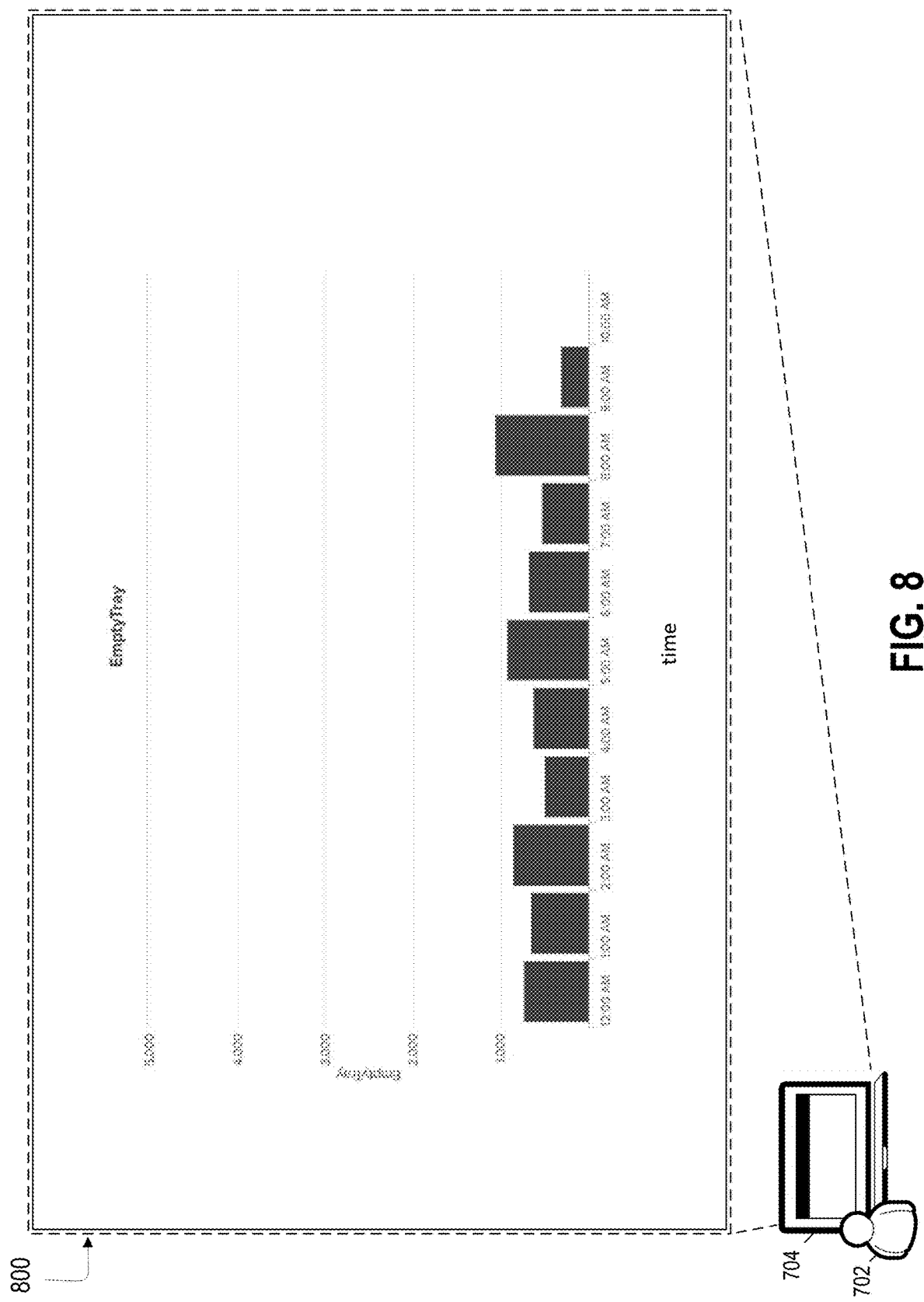
FIG. 8 is an example user interface depicting a chart illustrating an empty carton rate over a predetermined period of time at a particular location within a warehouse environment.
Figure 9:
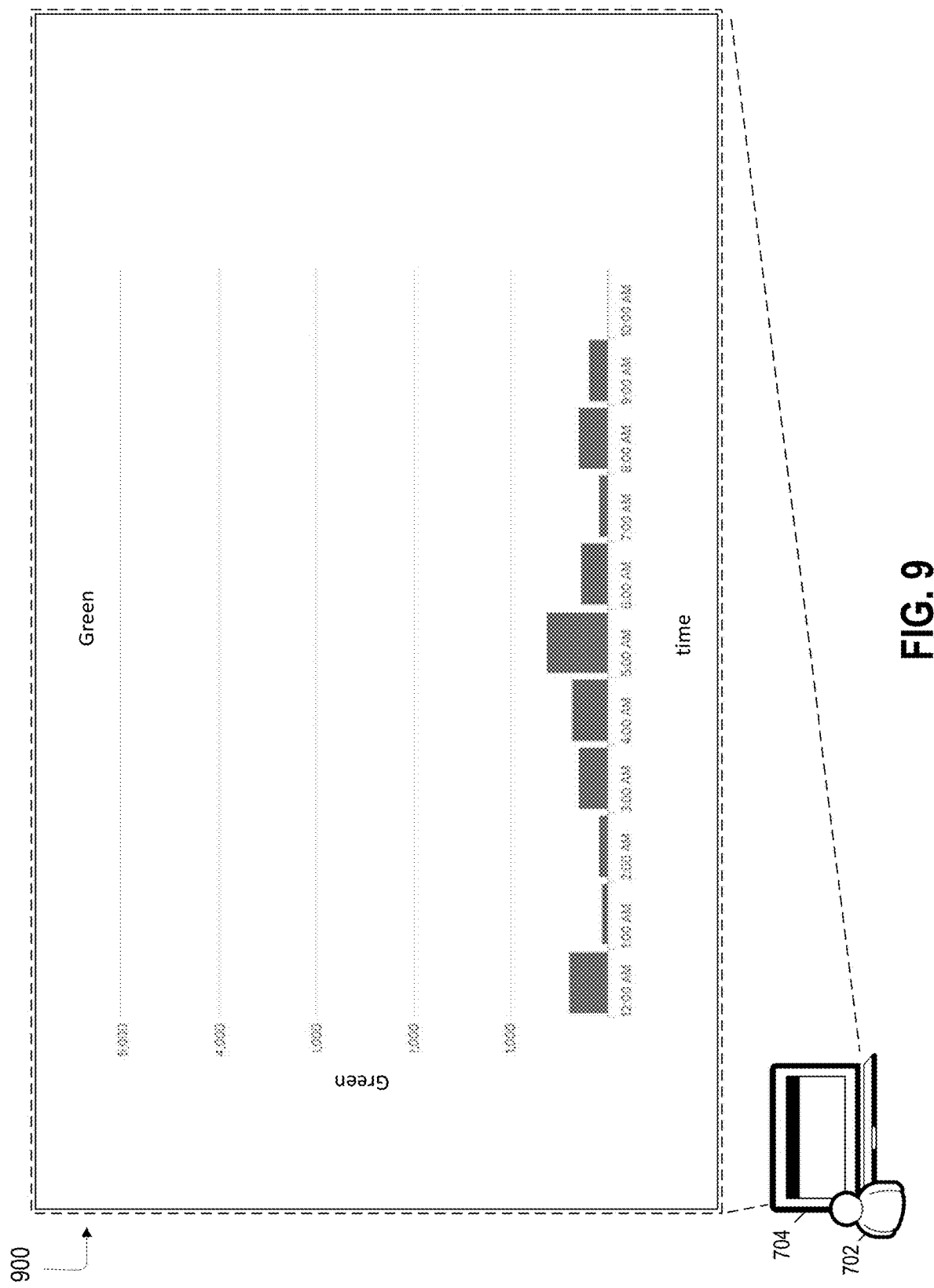
FIG. 9 is an example user interface depicting a chart illustrating a rate at which no damage is detected in a carton image at a particular location within a warehouse environment.

Referring now to FIGS. 7-9, additional user interfaces are presented including charts that provide statistical reporting of automated carton damage assessments. Such user interfaces and charts may be presented, for example, via the dashboard 250 of FIG. 2, above.

FIG. 7 illustrates a user interface 700 that presents rates at which automated carton damage assessments are performed, over time within a warehouse environment. The user interface 700 may be presented to a user 702 (e.g., typically a supply chain analyst or warehouse supervisor) via a computing system 704, which accesses the dashboard 250 described above. In the example shown, an hourly aggregate number of cartons that are determined to be "good" (undamaged) is illustrated. This may be used, for example, to determine the throughput at a particular location within a warehouse, potential busy or bottleneck times at a particular routing location, or simply rates of the success of carton damage assessment.

FIG. 8 illustrates a further user interface 800, including an example chart illustrating an empty carton rate over a predetermined period of time at a particular location within a warehouse environment. In this example, similar hourly aggregate numbers are presented as compared to the user interface 700; however, in this instance the aggregated statistic relates to instances in which an empty curtain passes below an imaging system (camera) at a particular routing location.

FIG. 9 illustrates a further user interface 900, including an example chart illustrating a rate at which no damage is detected in a carton image at a particular location within a warehouse environment. In this instance, more than simply been considered "good", the carton will have passed a secondary threshold indicating that damage is very unlikely (e.g., due to the "green" indicator representing a high confidence that no significant damage has occurred to the carton).

FIG. 10 illustrates a still further user interface 1000 that includes an example carton damage analysis interface. The user interface 1000 allows a user to view where carton damage may have occurred at various locations within a warehouse environment, or track carton damage to a particular carton, according to an example embodiment. In the example shown, a user may select a particular time period for which all cartons that are analyzed may be reported, as well as a particular distribution center ("DC") and/or barcode. If the user selects a particular time period, details regarding the distribution center may be presented for that time period. This includes a set of timestamps, particular sorting line at which an image or analysis is performed, a captured barcode that was visible within and extracted from image data, as well as result, status, and exit path information for each carton that is located. Additionally, a link to an image captured at that particular location and time may be provided, allowing a user to visually inspect each carton by retrieving a captured image from the WMS system.

The user interface 1000 also presents to a user conveyor or sorter-specific details regarding a time at which a particular carton (identified by its bar code). This may include a sequence of timestamp events for a specific barcode or within a particular period of time. By selecting a particular bar code, a history of analyses of that barcode may be presented to a user, who may then (1) track the movement of the carton through the warehouse and (2) track historical damage assessments of that specific carton, to determine a location at which carton damage may have occurred. This will allow an analyzing user to identify particular points either (1) at a time of receipt of a carton from a vendor, or (2) within the warehouse routing itself, where carton damage may have occurred to that particular carton (as compared to the generalized carton damage assessment trends described in conjunction with FIGS. 6-9).

In addition to the above, a variety of other types of information may be presented. For example, while an image analysis result and carton status may be displayed in some instances, more granular information may be presented in other cases, such as a raw score regarding extent of carton damage. Additionally, scores may be generated and displayed associated with particular nodes or locations within a warehouse, which may act as a proxy for a propensity for damage to occur at a location generally adjacent and upstream of the image capture location.

Referring to FIGS. 6-10 generally, it is apparent that the above tracking and storage of images, associated with automatic detection of carton damage and individual identification of cartons, allows for each carton to be assessed individually as it passes through the warehouse, and allows for individual stations within a warehouse to be assessed for purposes of damage occurring proximate to that station.

While particular uses of the technology have been illustrated and discussed above, the disclosed technology can be used with a variety of data structures and processes in accordance with many examples of the technology. The above discussion is not meant to suggest that the disclosed technology is only suitable for implementation with the data structures shown and described above. For examples, while certain technologies described herein were primarily described in the context of queueing structures, technologies disclosed herein are applicable to data structures generally.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, memory arrangements, etc.) described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. A method comprising:
    capturing one or more images of a carton via a camera system at a routing location within a warehouse of a retail supply chain;
    applying a machine learning model to determine a likelihood of damage of the carton;
    based on the likelihood of damage being above a particular threshold, identifying the carton as damaged;
    storing a carton assessment record in a carton damage tracking database, the carton assessment record including the one or more images of the carton alongside the likelihood of damage and the routing location;
    receiving user feedback regarding whether the carton is damaged; and
    retraining the machine learning model with the user feedback.

2. The method of claim 1, wherein the machine learning model is trained using training images of damaged cartons and undamaged cartons.

3. The method of claim 1, further comprising determining, based on a collection of carton assessment records, a root cause for carton damage as corresponding to the routing location.

4. The method of claim 1, wherein the routing location is a location within a warehouse selected from among a plurality of routing locations at which images of the carton are captured.

5. The method of claim 1, wherein the carton assessment record includes an identifier of the carton.

6. The method of claim 5, further comprising collecting carton assessment records associated with the identifier and determining, based on the carton assessment records, a routing location proximate to which damage to the carton occurred.

7. The method of claim 1, wherein the machine learning model comprises a convolutional neural network model that is deployed at a computing system at the warehouse.

8. The method of claim 7, wherein the computing system is located at the warehouse of the retail supply chain and applying the machine learning model is performed locally at the computing system.

9. The method of claim 1, further comprising:
    capturing images of the carton via a plurality of different camera systems positioned at different routing locations within the warehouse; and
    based on outputs of the machine learning model in response to each of the images, identifying a routing location from among the different routing locations proximate to which damage to the carton occurred.

10. The method of claim 1, further comprising:
    capturing images of a plurality of different cartons via the camera system at the routing location; and via camera systems positioned at different routing locations within the warehouse; and
    based on outputs of the machine learning model in response to each of the images, identifying a routing location from among the different routing locations proximate to which damage to cartons commonly occurs.

11. A carton damage detection system comprising:
    an image capture system located at a routing location within a warehouse of a retail supply chain; and
    an image analysis server local to the image capture system, the image analysis server communicatively connected to the image capture system and configured to host a carton damage tracking database, the image analysis server configured to:
        receive at least one image of a carton from the image capture system;
        apply a machine learning model to the at least one image to determine a likelihood that the carton is damaged; and
        store a carton assessment record in the carton damage tracking database, the carton assessment record including the at least one image of the carton alongside the likelihood that the carton is damaged and the routing location;
    wherein the image analysis server is configured to receive user feedback regarding whether the carton is damaged, the user feedback being used to retrain the machine learning model.

12. The carton damage detection system of claim 11, further comprising a plurality of image capture systems located at routing locations within a plurality of warehouses across a retail supply chain.

13. The carton damage detection system of claim 11, further comprising a dashboard accessible via the image analysis server, the dashboard configured to present at least some contents of a carton assessment record.

14. The carton damage detection system of claim 11, further comprising a display communicatively connected to the image analysis server, the display being configured to present an annotated image of the carton including indicia regarding whether the carton is damaged.

15. The carton damage detection system of claim 11, further comprising likelihood that the carton is damaged.

16. The carton damage detection system of claim 11, wherein the machine learning model comprises a convolutional neural network.

17. A method comprising:
    automatically capturing one or more images of cartons via camera systems positioned at each of a plurality of routing locations within a warehouse of a retail supply chain;

applying a machine learning model to determine a likelihood of damage to each of the cartons, the machine learning model being a convolutional neural network trained using sample images of damaged cartons and undamaged cartons;

based on the likelihood of damage to a carton from among the imaged cartons being above a particular threshold, identifying the carton as damaged;

storing a carton assessment record in a carton damage tracking database for each of the cartons, the carton assessment record including the one or more images alongside the likelihood of damage and the routing location at which the images are captured;

identifying a location within the warehouse as a root cause of damage to cartons based on damage being detected via the camera systems of the plurality of routing locations;

receiving user feedback regarding whether the carton is damaged; and retraining the machine learning model with the user feedback at an image analysis server communicatively connected to the camera systems.

18. The method of claim 17, further comprising comparing a rate of damage to cartons at the location to a rate of damage to cartons at corresponding locations of other warehouses within the retail supply chain.

19. The method of claim 17, further comprising replacing the carton with an undamaged carton.

20. A carton damage detection system comprising:

an image capture system located at a routing location within a warehouse of a retail supply chain;

an image analysis server local to the image capture system, the image analysis server communicatively connected to the image capture system and configured to host a carton damage tracking database, the image analysis server configured to:

receive at least one image of a carton from the image capture system;

apply a machine learning model to the at least one image to determine a likelihood that the carton is damaged; and store a carton assessment record in the carton damage tracking database, the carton assessment record including the at least one image of the carton alongside the likelihood that the carton is damaged and the routing location; and a dashboard accessible via the image analysis server, the dashboard configured to present at least some contents of the carton assessment record.

21. A method comprising:

automatically capturing one or more images of cartons via camera systems positioned at each of a plurality of routing locations within a warehouse of a retail supply chain;

applying a machine learning model to determine a likelihood of damage to each of the cartons, the machine learning model being a convolutional neural network trained using sample images of damaged cartons and undamaged cartons;

based on the likelihood of damage to a carton from among the imaged cartons being above a particular threshold, identifying the carton as damaged;

storing a carton assessment record in a carton damage tracking database for each of the cartons, the carton assessment record including the one or more images alongside the likelihood of damage and the routing location at which the images are captured;

identifying a location within the warehouse as a root cause of damage to cartons based on damage being detected via the camera systems of the plurality of routing locations; and comparing a rate of damage to cartons at the location to a rate of damage to cartons at corresponding locations of other warehouses within the retail supply chain.

* * * * *